US008749713B2

(12) United States Patent
Han

(10) Patent No.: US 8,749,713 B2
(45) Date of Patent: Jun. 10, 2014

(54) VIDEO PROCESSING APPARATUS AND METHOD

(75) Inventor: Jea-hee Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 644 days.

(21) Appl. No.: 12/426,373

(22) Filed: Apr. 20, 2009

(65) Prior Publication Data

US 2010/0039560 A1 Feb. 18, 2010

(30) Foreign Application Priority Data

Aug. 12, 2008 (KR) ........................ 10-2008-0079107

(51) Int. Cl.
*H04N 9/64* (2006.01)
*H04N 9/74* (2006.01)

(52) U.S. Cl.
USPC ........... 348/716; 348/578; 348/580; 348/714; 348/715

(58) Field of Classification Search
USPC .......................................................... 348/578
See application file for complete search history.

(56) References Cited

U.S. PATENT DOCUMENTS

| | | | | |
|---|---|---|---|---|
| 5,245,414 A * | 9/1993 | Wischermann | 348/500 |
| 5,790,096 A * | 8/1998 | Hill, Jr. | 345/600 |
| 6,407,746 B1 * | 6/2002 | Tanizawa | 345/649 |
| 2004/0183809 A1 | 9/2004 | Chee et al. | |
| 2005/0248585 A1 * | 11/2005 | Inoue et al. | 345/619 |

FOREIGN PATENT DOCUMENTS

| | | | |
|---|---|---|---|
| CN | 1719906 | A | 1/2006 |
| CN | 1734495 | A | 2/2006 |
| EP | 1 594 119 | A2 | 11/2005 |
| EP | 1594119 | A2 | 11/2005 |
| WO | 2005/083672 | A2 | 9/2005 |

OTHER PUBLICATIONS

Communication dated Jan. 30, 2013 from the State Intellectual Property Office of P.R. China in counterpart Chinese application No. 200910137196.8.

Communication dated Oct. 9, 2012 issued by the European Patent Office in counterpart European Patent Application No. 09156962.4.

* cited by examiner

*Primary Examiner* — Jefferey Harold
*Assistant Examiner* — Michael Teitelbaum
(74) *Attorney, Agent, or Firm* — Sughrue Mion, PLLC

(57) ABSTRACT

There are provided a video processing apparatus and a video processing method. The video processing apparatus includes: a buffer for storing data of an image frame inputted from the outside in the unit of line; a memory unit for randomly writing and reading data; a video processing unit for processing and outputting the image frame; and a central processing unit for inverting the image frame left-side right and/or upside down when writing the image frame stored in the buffer in the memory unit and/or reading the image frame from in the memory unit.

17 Claims, 12 Drawing Sheets

VIDEO PROCESSING APPARATUS AND METHOD

CROSS-REFERENCE TO RELATED APPLICATION

This application claims priority from Korean Patent Application No. 10-2008-0079107, filed on Aug. 12, 2008 in the Korean Intellectual Property Office, the disclosure of which is incorporated herein by reference.

BACKGROUND OF INVENTION

1. Field of Invention

Apparatuses and methods consistent with the present invention relate to realizing a correct and definite display of an image or video screen.

2. Description of Related Art

Recently, a flat panel television has been rapidly developed in view of its advantages of slimness and low power consumption. The flat panel television tends to be larger and slimmer.

Conventionally, for cost reduction or to deal with heat generated in a video processing apparatus, components or wirings in the video processing apparatus has been modified.

In the conventional video processing apparatus, an input image frame is processed in a fixed direction, and thus, a displayed video are inverted left-side right or upside down, thereby preventing a correct and definite image or video display.

SUMMARY OF INVENTION

Accordingly, it is an aspect of the present invention to provide a video processing apparatus and a video processing method which can realize a correct and definite display of an image or video screen.

Additional aspects of the present invention will be set forth in part in the description which follows and, in part, will be obvious from the description, or may be learned by practice of the present invention.

The foregoing and/or other aspects of the present invention can be achieved by providing a video processing apparatus including: a buffer for storing data of an image frame inputted from the outside in the unit of line; a memory unit for randomly writing and reading data; a video processing unit for processing and outputting the image frame; and a central processing unit for inverting the image frame left-side right and/or upside down when writing the image frame stored in the buffer in the memory unit and/or reading the image frame from in the memory unit.

The buffer may be included in the central processing unit or the memory unit.

The central processing unit, if the central processing unit inverts the image frame left-side right during writing or reading, may invert a chrominance component U and a chrominance component V for forming a pixel and store the inverted chrominance components in the buffer.

The central processing unit, if the central processing unit inverts the image frame left-side right during writing or reading, may invert a chrominance component U and a chrominance component V for forming a pixel and store the inverted chrominance components in the buffer.

The central processing unit may process the image frame written in the memory unit by progressive scanning or interlaced scanning.

The central processing unit, if the central processing unit processes the image frame inverted upside down during writing by the interlaced scanning, may ignore a first even line of the image frame stored in the memory unit and process the next odd line thereof The central processing unit, if the central processing unit inverts the image frame upside down during reading by the interlaced scanning, may ignore the last even line of the image frame stored in the memory and may process the next odd line thereof.

The memory unit may include a plurality of regions, in which data processed by inverting the image frame left-side right and/or upside down may be written.

The central processing unit may invert left-side right the data stored in the buffer in the unit of line when writing the data in the memory unit, and invert upside down the image frame written in the memory when reading the image frame.

The foregoing and/or other aspects of the present invention can be also achieved by providing a video processing method in a video processing apparatus, including: storing data of an image frame inputted from the outside in the unit of line; inverting the stored image frame left-side right and/or upside down when writing the image frame in a memory unit; inverting the written image frame left-side right and/or upside down when reading the image frame from the memory unit; and outputting the read image frame.

A chrominance component U and a chrominance component V may be inverted and stored in a buffer when the image frame is inverted left-side right during writing or reading.

The image frame written in the memory unit may be processed by progressive scanning or interlaced scanning.

A first even line of the image frame stored in the memory unit may be ignored and the next odd line may be processed if the image frame inverted upside down is processed by the interlaced scanning.

The last even line of the image frame stored in the memory unit may be ignored and the next odd line may be processed if the image frame is inverted upside down during reading.

The data processed by inverting the image frame left-side right and/or upside down may be written in respective regions forming the memory unit.

The data stored in the buffer may be inverted left-side right when written in the memory unit, and the image frame written in the memory unit may be inverted upside down when read from the memory unit.

BRIEF DESCRIPTION OF DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
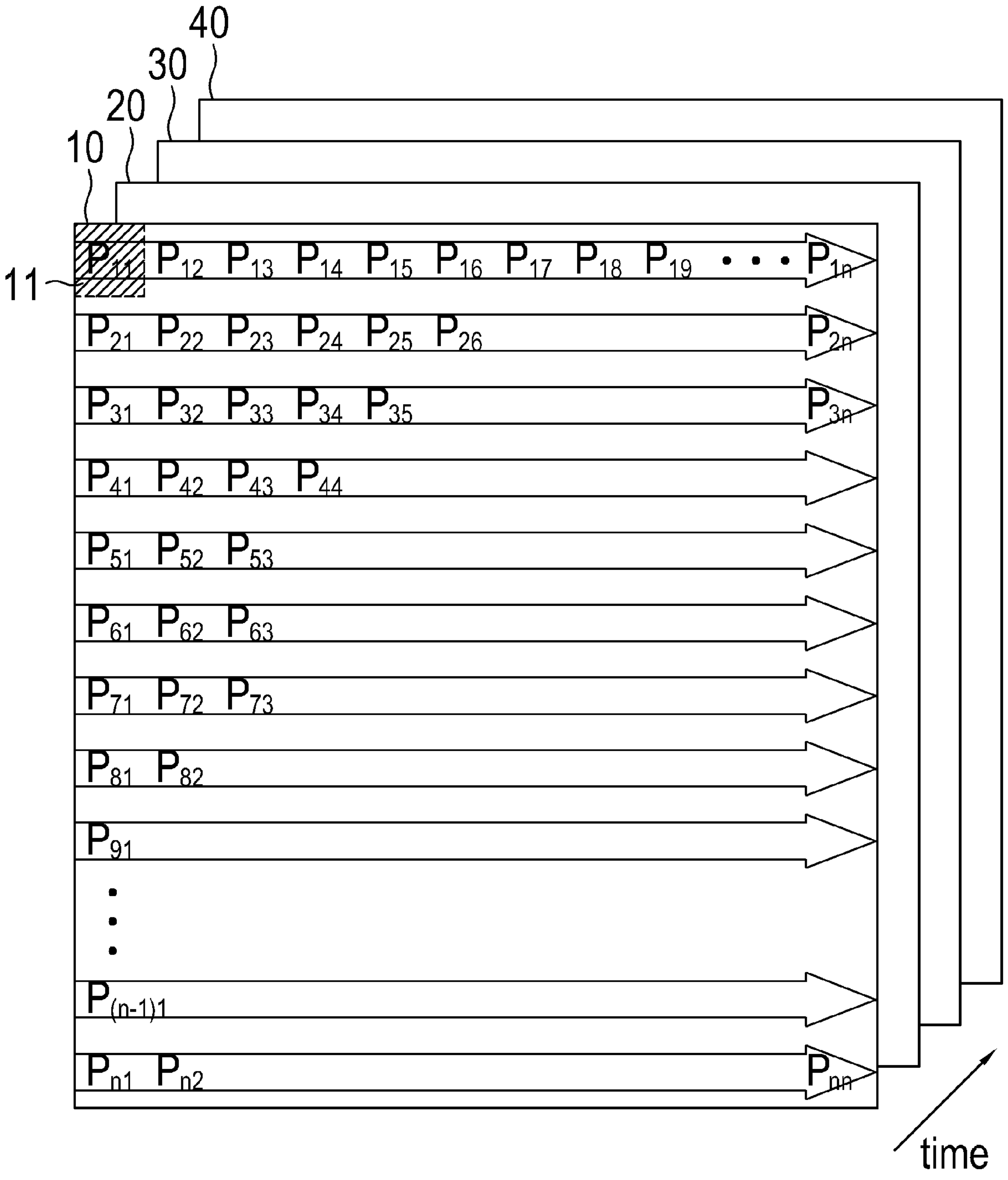
FIG. 1 illustrates a scanning direction of an image frame.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Repetitive description to like elements may be omitted as necessary.

FIG. 1 illustrates a scanning direction of an image frame.

A video screen includes consecutive image frames. That is, numerous image frames are consecutively displayed as a video screen at such a high speed that cannot be perceived by a naked eye. For example, as shown in FIG. 1, a first image frame 10, a second image frame 20, a third image frame 30 and a fourth image frame 40 may be sequentially displayed to form a video.

Each image frame includes a number of pixels. A pixel 11 is the smallest unit forming an image frame and is generally of a rectangular shape.

If an image frame is inputted, a video processing apparatus initiates scanning the inputted image frame in a predetermined direction. The scanning is generally performed from a left side of the image frame to a right side thereof and from an up side to a down side thereof, as in reading a book. In this respect, the left-right scanning is referred to as a horizontal scanning and the up-down scanning is referred to as a vertical scanning.

Referring to FIG. 1, the video processing apparatus scans the inputted first image frame 10 as follows:

Firstly, a horizontal scanning is performed for the first line forming the first image frame from the left side to the right side. That is, pixels P11, P12, P13, P14, P15, P16, P17 . . . and P1*n* are sequentially scanned.

Then, the second line of the first image frame is scanned according to the order of the vertical scanning. Thus, pixels P21, P22, P23, P24, P25, P26, P27 . . . and P2*n* forming the second line are sequentially scanned.

By repeating the above processes, pixels Pn1, Pn2, Pn3, Pn4, Pn5, Pn6, Pn7 . . . and Pnn forming the last line are sequentially scanned, thereby completing the scanning process for one image frame.

Figure 2:
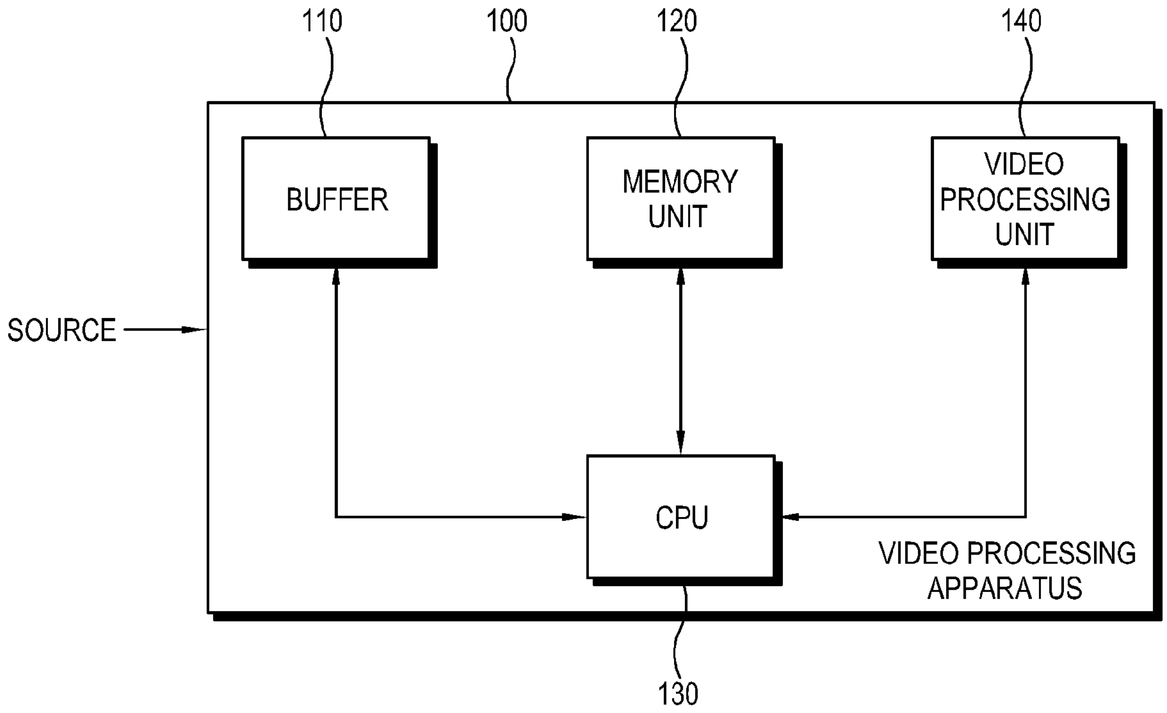
FIG. 2 illustrates a video processing apparatus according to a first exemplary embodiment of the present invention.

FIG. 2 illustrates a video processing apparatus 100 according to a first exemplary embodiment of the present invention.

The video processing apparatus 100 may include a buffer 110, a memory unit 120, a central processing unit (CPU) 130 and a video processing unit 140.

The buffer 110 stores data of image frames inputted from the outside in the unit of line. The buffer 110 may be a line buffer. The line buffer stores data of one line forming an image frame. Thus, the line buffer may be embodied as a relatively small capacity memory, differently from a frame buffer for storing the whole image frame and the memory unit 120 (to be described later) temporarily storing an image frame scanned for video processing.

According to another exemplary embodiment of the present invention, the buffer 110 may be included in the CPU 130 or the memory unit 120.

The memory unit 120 is used to randomly write and read data. More specifically, the memory unit 120 may be embodied as a RAM (Random Access memory), a DRAM (Dynamic RAM), an SRAM (static RAM), or the like.

When the CPU 130 inverts an image frame stored in the buffer 110 left-side right and/or upside down and writes the inverted image frame on the memory unit 120, the memory unit 120 temporarily stores the inverted frame.

More specifically, the memory unit 120 may include a plurality of regions. In each of the regions can be written data obtained by inverting the image frame.

If an image frame is inputted from the outside, the CPU 130 stores the inputted image frame in the buffer 110. In this respect, the image frame is inputted in a consecutive data format. The input data is sequentially stored in the buffer 110 according to the horizontal and vertical scanning, as described with reference to FIG. 1.

When an image frame stored in the buffer 110 is written in the memory unit 120 and/or when the image frame written in the memory unit 120 is read, the CPU 130 may invert the image frame left-side right and/or upside down.

More specifically, the CPU 130 may invert the image frame 1) left-side right only; 2) upside down only; or 3) both left-side right and upside down.

In the case of 1) or 2), the CPU 130 may perform inversion when writing the image frame in the memory unit 120 or when reading the image frame from the memory unit 120.

In the case of 3), the CPU 130 may invert the image frame a) left-side right when writing the image frame in the memory unit 120 and upside down when reading the image frame from the memory unit 120; b) upside down when writing the image frame in the memory unit 120 and left-side right when reading the image frame from the memory unit 120; c) both left-side right and upside down when writing the image frame in the memory unit 120; or d) both left-side right and upside down when reading the image frame from the memory unit 120.

Hereinafter, an image obtained by a left-side right inversion is referred to as a 'mirror image', and an image obtained by an upside down inversion is referred to as a 'vertical flip image'.

When processing a mirror image according to the present invention, the CPU 130 may perform a UV swap function. The UV swap function will be described later with reference to FIGS. 5A, 5B and 6.

When processing a vertical flip image according to the present invention, the CPU 130 may perform an even/odd swap function, which will be described later with reference to FIGS. 7A, 7B and 8.

The CPU 130 may process the image frame written in the memory unit 120 by progressive or interlaced scanning.

The video processing unit 140 outputs a processed image frame. More specifically, when reading the image frame from the memory unit 120 as it is or reading by inverting the image frame from the memory unit 120, the video processing unit 140 scales the image frame to be suitable for an output standard of a screen.

As described above, according to the present invention, a mirror image and a vertical flip image can be realized in a variety of methods. In this respect, the buffer 110 and the memory unit 120 may be modified to be suitable for different embodiments of the present invention.

For example, assuming that the buffer 110 is embodied as a line buffer in which one line can be stored, a vertical flip image cannot be firstly realized. It is because the last line is not yet inputted and cannot be firstly written in the memory unit 120 in the state that only the first line is inputted.

Such a problem can be solved by dividing the memory unit 120 into a plurality of regions. That is, if an image frame is written in a first region as it is and an image frame inverted upside down is written in a second region, a vertical flip image can be firstly realized. In this way, if the memory unit 120 includes a plurality of regions, an image frame inverted upside down and/or left-side right may be written in the respective regions.

Figure 3:
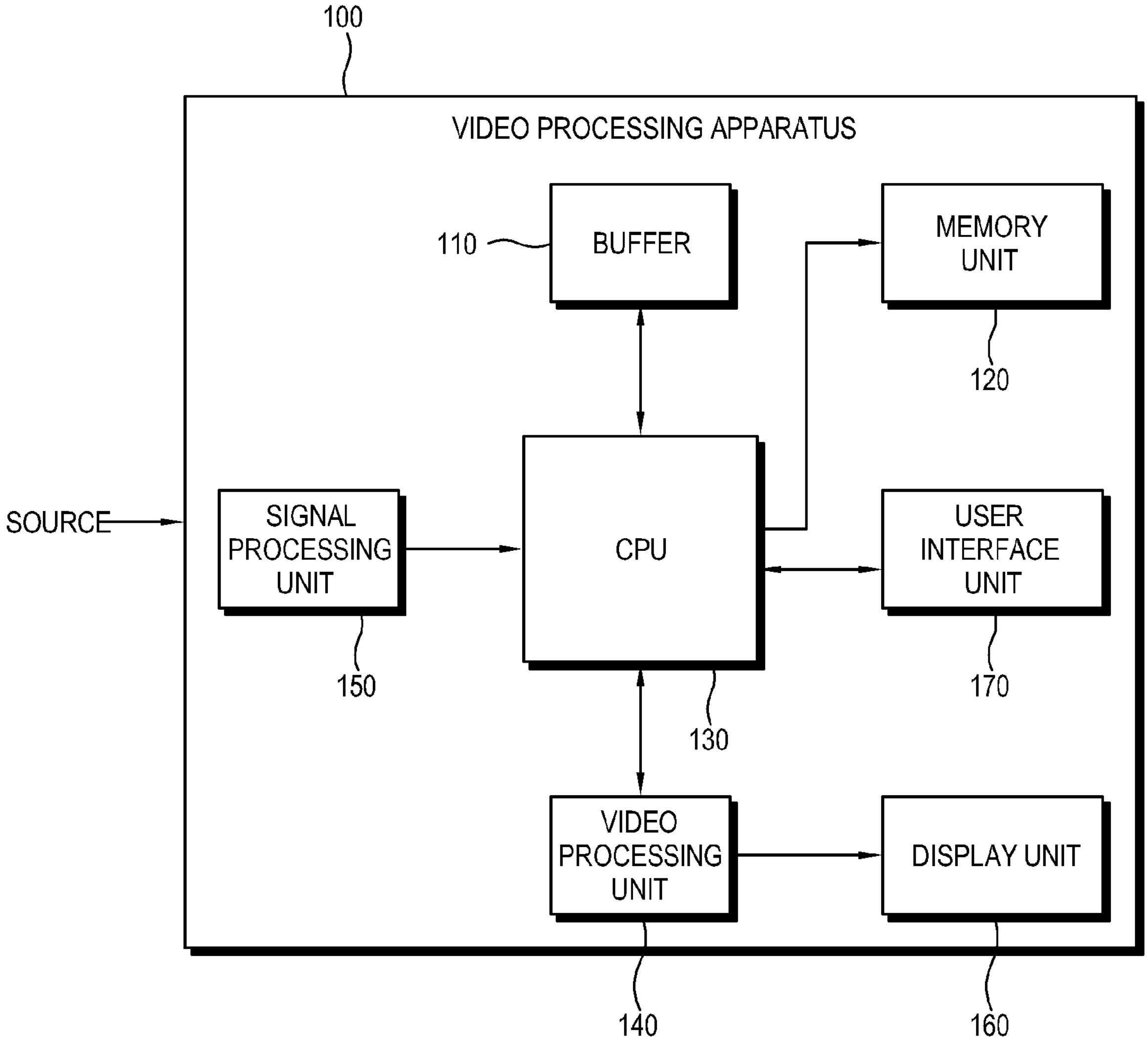
FIG. 3 illustrates a video processing apparatus according to a second exemplary embodiment of the present invention.

FIG. 3 illustrates a video processing apparatus 100 according to a second exemplary embodiment of the present invention.

The video processing apparatus 100 according to the second embodiment may include a signal processing unit 150, a buffer 110, a memory unit 120, a CPU 130, a video processing unit 140, a display unit 160 and a user interface unit 170.

The signal processing unit 150 may demodulate a received video signal into an original signal. Also, the signal processing unit 150 converts a video signal inputted from the outside into a predetermined format. For example, the signal processing unit 150 may convert an RGB video signal into a YUV format used in a television, or convert a 4:4:4 YUV signal into a 4:2:2 YUV signal.

The display unit 160 displays a video screen outputted from the video processing unit 140. The display unit 160 may be embodied as an LCD, an OLED, a PDP or the like.

The user interface unit 170 may perform a mirror image processing function or a vertical flip image processing function under the control of a user. The user may control the user interface unit 170 by an OSD (On Screen Demand) generated in a screen of the video processing apparatus 100, a button located in a front part or a side part of the video processing apparatus 100, or a remote controller with buttons for the above functions.

Figure 4:
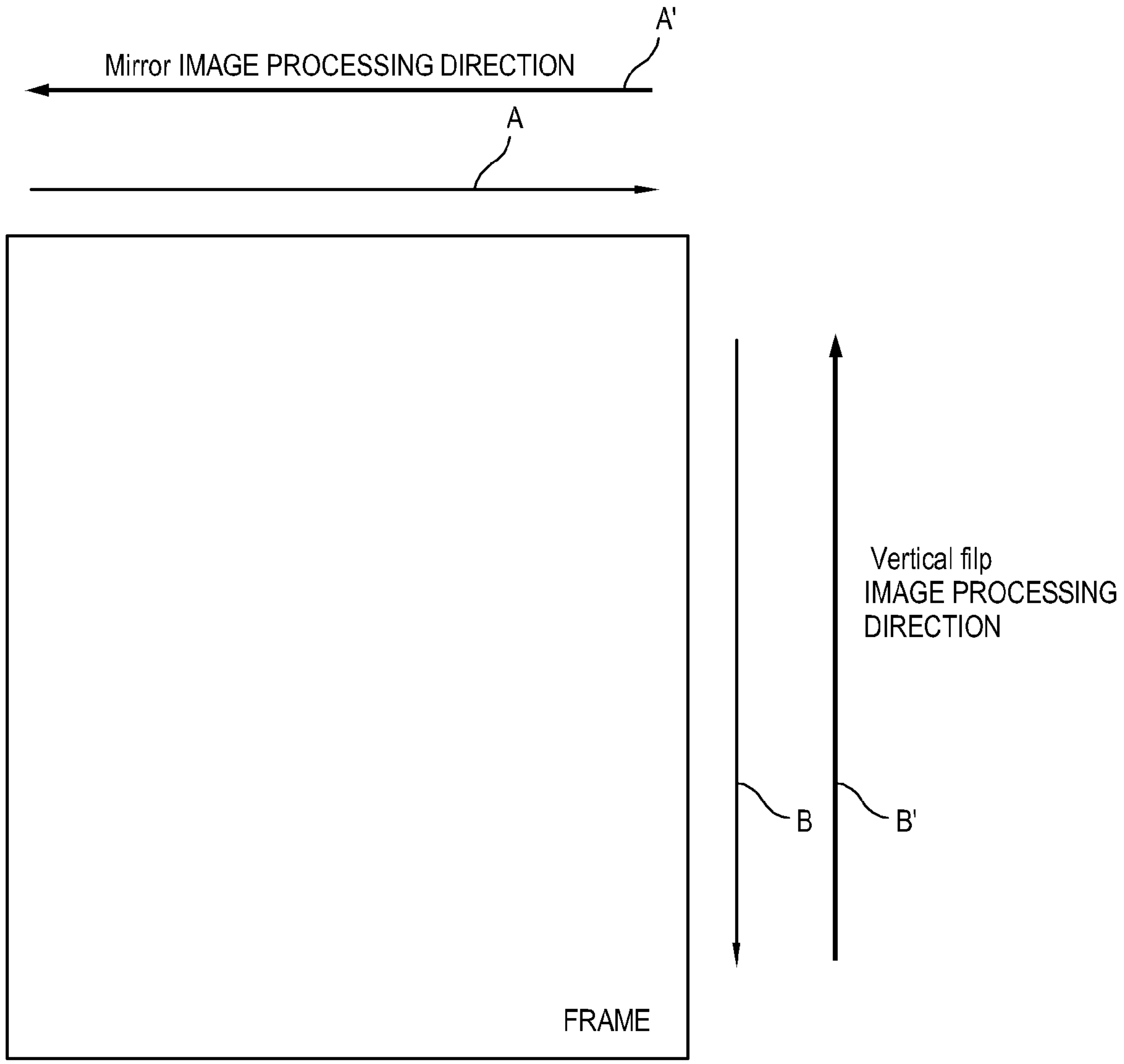
FIG. 4 illustrates a processing direction of a mirror image and a vertical flip image according to the present invention.

FIG. 4 illustrates a processing direction of a mirror image and a vertical flip image according to the present invention.

In order to obtain a mirror image in which an image frame is inverted left-side right, data (pixels) forming each line should be inversely processed. That is, data in each line should be processed from right to left, that is, in a direction A' when writing data in the memory unit 120 or reading data from the memory unit 120, unlike a conventional direction A which is the same as a horizontal scanning direction.

In order to obtain a vertical flip image in which an image frame is inverted upside down, lines forming an image frame should be inversely processed. That is, the respective lines of the image frame should be processed from down to up, that is, in an arrow B' direction, unlike a conventional direction B which is the same as the vertical scanning direction.

Figure 5A:
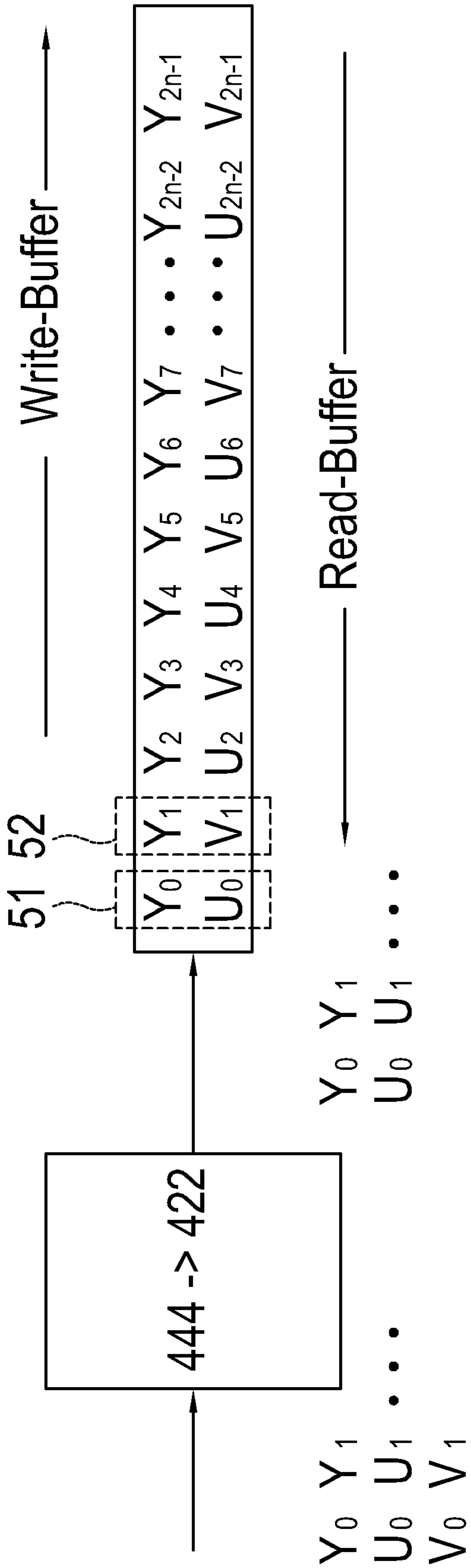
FIG. 5A illustrates lines stored in a buffer, when a UV swap function according to the present invention is not performed.
Figure 5B:
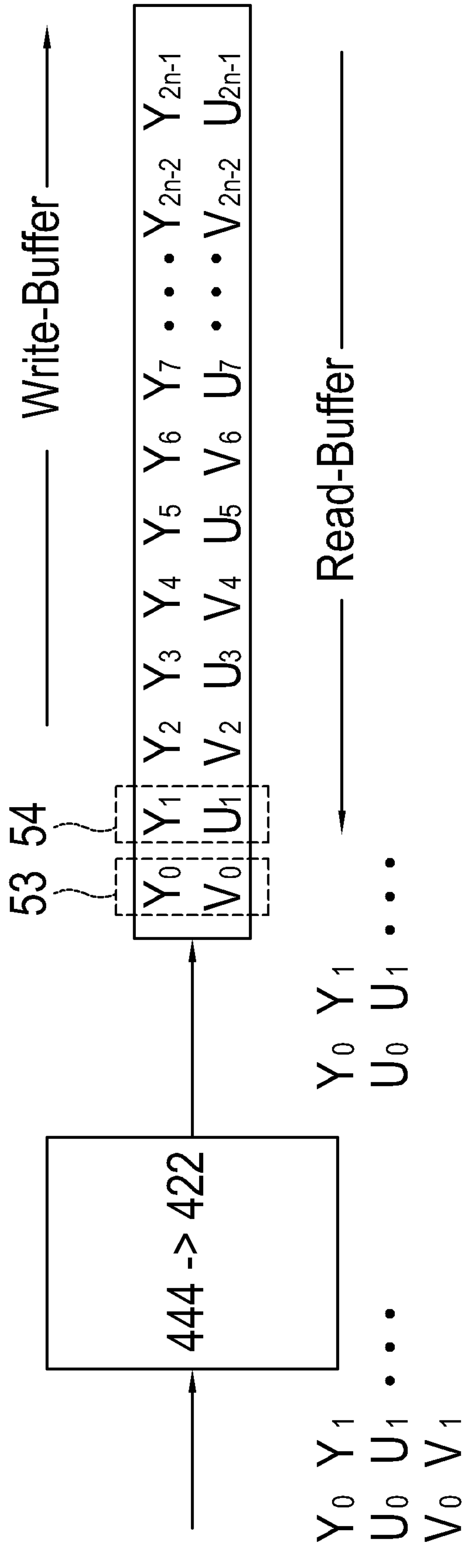
FIG. 5B illustrates lines stored in a buffer, when the UV swap function according to the present invention is performed.

FIG. 5A illustrates lines stored in a buffer, with a UV swap function according to the present invention being not performed; and FIG. 5B illustrates lines stored in a buffer, with the UV swap function according to the present invention being performed.

Typically, a television displays a video color using a YUV format in which a color is displayed with a luminance signal Y, a difference U between the luminance signal and a blue component, and a difference V between the luminance signal and a red component. In this respect, the difference U between the luminance signal and the blue component, and the difference V between the luminance signal and the red component correspond to chrominance signals, respectively. According to the NTSC format, the YUV format is to apply two-dimensional U and V components to a Y component as sub-carriers (color carriers).

A YUV signal of a YUV format is converted through inside processing. In this respect, a 4:4:4 YUV signal is converted into a 4:2:2 YUV signal. Here, 4:4:4 and 4:2:2 represent proportions of sampled frequencies of the luminance signal Y and two chrominance signals U and V, respectively. That is, in the case of the 4:2:2 format, two chrominance signals U and V are sampled in a proportion of ½ compared with the luminance signal Y. A human visual sense is generally more sensitive to luminance than chrominance, and thus cannot nearly sense a visual difference between the 4:4:4 format and the 4:2:2 format. In the case of the 4:2:2 format, the bandwidth of a video signal is reduced into ⅔ compared with the 4:4:4 format.

A process of converting a 4:4:4 YUV signal into a 4:2:2 YUV signal is as follows:

In the case of the 4:2:2 format, since two chrominance signals U and V are sampled in a proportion of ½ compared with the luminance signal Y, the U and V components are alternately sampled for every luminance signal Y component. Referring to FIG. 5A, a $Y_0U_0V_0$ signal firstly inputted is converted into $Y_0U_0$ (51) by sampling a luminance component $Y_0$ and a chrominance component $U_0$. A $Y_1U_1V_1$ signal next inputted is converted into $Y_1V_1$ (52) by sampling a luminance component $Y_1$ and a chrominance component $V_1$. In this way, input YUV signals are sequentially converted. Consequently, the $Y_0U_0V_0$ signal is converted into a data unit $Y_0U_0$ (51), the $Y_1U_1V_1$ signal into a data unit $Y_1V_1$ (52), and a $Y_{2n-1}U_{2n-1}V_{2n-1}$ signal into a data unit $Y_{2n-1}V_{2n-1}$, respectively. However, since the Y, U and V components should be combined with each other to realize a pixel, the data unit $Y_0U_0$ (51) and the data unit $Y_1V_1$ (52) should be combined with each other to realize a pixel.

The converted signals are stored in the buffer 110. Referring to FIG. 5A, in the buffer 110 are sequentially stored respective data units $Y_0U_0$ (51), $Y_1V_1$ (52), $Y_2U_2$, $Y_3V_3$, . . . , $Y_{2n-2}U_{2n-2}$ and $Y_{2n-1}V_{2n-1}$. In the case of the 4:2:2 format, since the U and V components are sampled with the same proportion, if the first data unit includes the U component, the corresponding line must end with a data unit including the component V.

When data units stored in the buffer 110 are written inversely, that is, from right to left in the memory unit 120 to realize a mirror image, the data units are written in the order of $Y_{2n-1}V_{2n-1}$, $Y_{2n-2}U\mathbf{2}_{n-2}$, . . . , $Y_3V_3$, $Y_2U_2$, $Y_1V_1$ (52) and $Y_0U_0$ (51). In this case, the order of two chrominance components U and V in two data unit forming a pixel is inverted from U-V to V-U. Thus, color inversion occurs, thereby resulting in incorrect and indefinite color reproduction of an image or video screen.

To prevent such color inversion, a UV swap function according to the present invention is performed to process a mirror image. The UV swap function is to invert the U and V components in data units forming a pixel for storage when an input YUV signal is converted during internal processing.

The first input $Y_0U_0V_0$ signal is converted into $Y_0U_0$ by sampling the luminance component $Y_0$ and the chrominance component $U_0$. The second input $Y_1U_1V_1$ signal is converted into $Y_1V_1$ by sampling the luminance component $Y_1$ and the chrominance component $V_1$. Then, the U and V components in the data units are inverted for storage. That is, the data unit $Y_0U_0$ is inverted into $Y_0V_0$ (53), and the $Y_1V_1$ is inverted into $Y_1U_1$, for storage.

FIG. 5B illustrates the state that the U and V components in the data units are inverted by the UV swap function for storage. As shown, data units are inversely written in the memory unit 120 from the last data unit to the first data unit to realize a mirror image. That is, the data units are written in the order of $Y_{2n-1}U_{2n-1}$, $Y_{2n-2}V_{2n-2}$, . . . , $Y_3U_3$, $Y_2V_2$, $Y_1U_1$ (54) and $Y_0V_0$ (53). Thus, the chrominance components U (blue) and V (red) are read in order, thereby realizing a correct and definite display of an image or video screen.

In FIG. 5B, one line in an image frame is shown by way of example, but similarly, the other lines can be inverted by the UV swap function.

According to an embodiment, the UV swap function may be controlled by a functional relationship or may be performed through an additional unit. In the case of the functional relationship, if a function value is 1, the UV swap function may be for example 'on'; and if a function value is 0, the UV swap function may be 'off'. In the case of the additional unit, the unit may control the UV swap function to be active or inactive.

According to another embodiment, the UV swap function may be performed when writing data in the memory unit 120 or when reading data from the memory unit 120.

Figure 6:
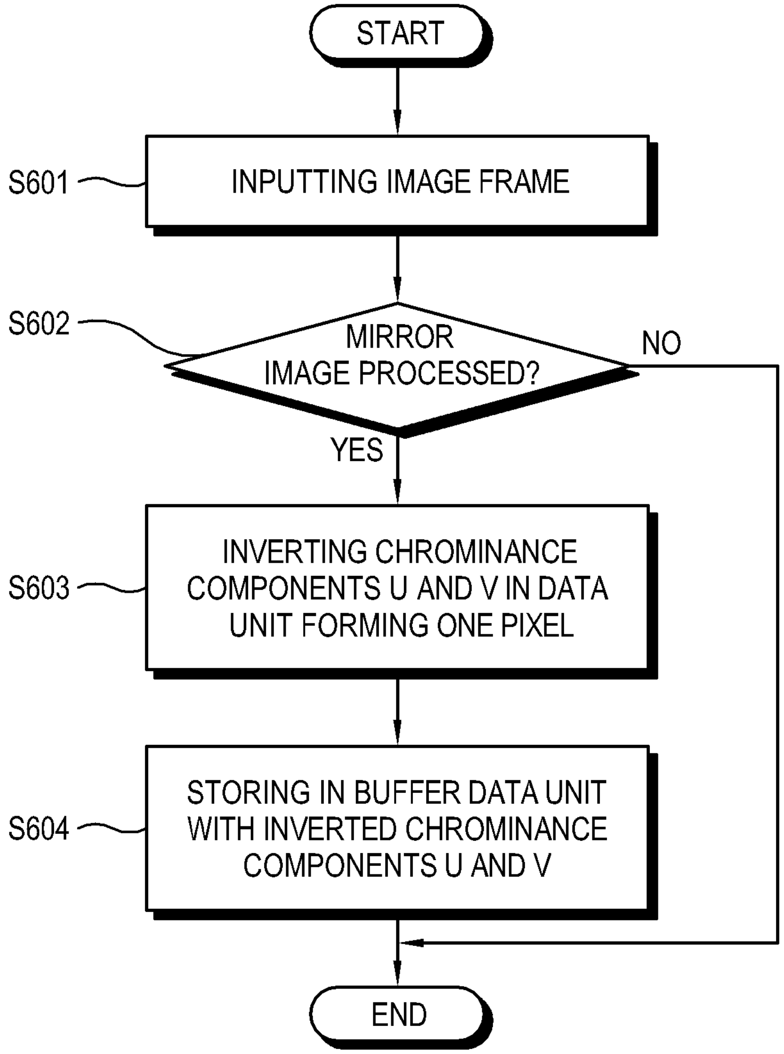
FIG. 6 is a flow diagram illustrating a process of performing the UV swap function according to an exemplary embodiment of the present invention.

Hereinafter, a process of performing the UV swap function according to an exemplary embodiment of the present invention will be described with reference to FIG. 6.

Firstly, an image frame is inputted from the outside (S601).

Then, the CPU 130 determines whether to process a mirror image (S602). The color inversion in which the chrominance components U and V are inverted occurs during mirror image processing, and thus, the UV swap function do not need to be performed if mirror image processing is not carried out.

If it is determined that a mirror image is to be processed, the CPU 130 inverts the chrominance components U and V in the data units forming a pixel (S603).

Then, the CPU 130 stores the data units with the chrominance components U and V being inverted in the buffer 110 (S604). The data units are stored in the order of $Y_0V_0$, $Y_1U_1$, $Y_2V_2$, $Y_3U_3$, . . . .

Hereinafter, problems generated when realizing a vertical flip image and a solution thereto will be described.

An image frame may be processed by progressive scanning or interlaced scanning.

In the progressive scanning mode, lines forming an image frame are processed from up to down. Thus, an image frame is outputted in sequence from the first line to the last line.

In the interlaced scanning mode, odd lines in an image frame are firstly scanned, and then, even lines are scanned. In this respect, a scan image made of odd lines is referred to as an odd field or a top field, a scan image made of even lines is referred to as an even field or a bottom field. One image frame is made of one odd field and one even field. Since time necessary for scanning one field is 1/60 second, 30 image frames are made every second. As described above, in televisions, such an interlaced scanning mode is generally employed.

Figure 7A:
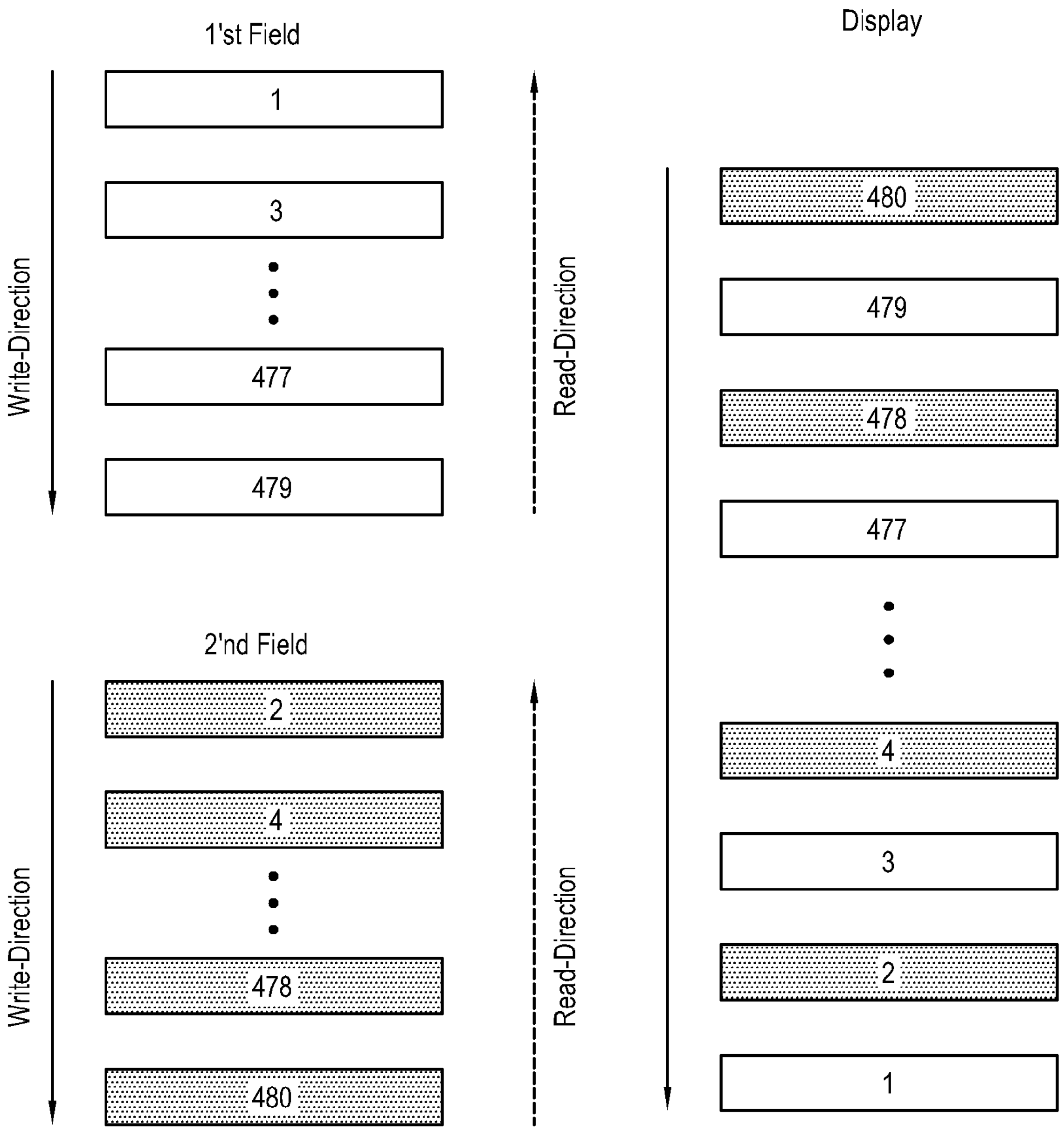
FIG. 7A illustrates a vertical flip image processed by an interlaced scanning mode.

FIG. 7A illustrates a vertical flip image processed by the interlaced scanning mode. In this respect, it is assumed that an image frame is inverted upside down when reading data from the memory unit 120, by way of example.

In the memory unit 120 (for example, DRAM) are written in order the first to 480th lines forming an image frame. An odd field is made of the first, third, fifth, . . . and 479th lines; and an even field is made of the second, fourth, sixth, . . . and 480th lines.

If an image frame is inverted upside down when reading data from the memory unit 120, the image frame is processed from the 480th line to the first line. That is, an even field made of the 480th, 478th, 476th, . . . and second lines is firstly scanned; and an odd field made of the 479th, 477th, 475th, . . . and first lines is scanned later. That is, the odd field which should be scanned firstly is scanned later, which causes field inversion between the odd and even fields, thereby resulting in coarse line boundaries in an image or video screen.

On the other hand, the progressive scanning mode does not include odd and even fields for scanning, and thus, such a field inversion does not occur. Thus, there is no need to perform an even/odd swap function (to be described later). In the progressive scanning mode, respective lines only have to be displayed in an inverse order to a storage order.

Figure 7B:
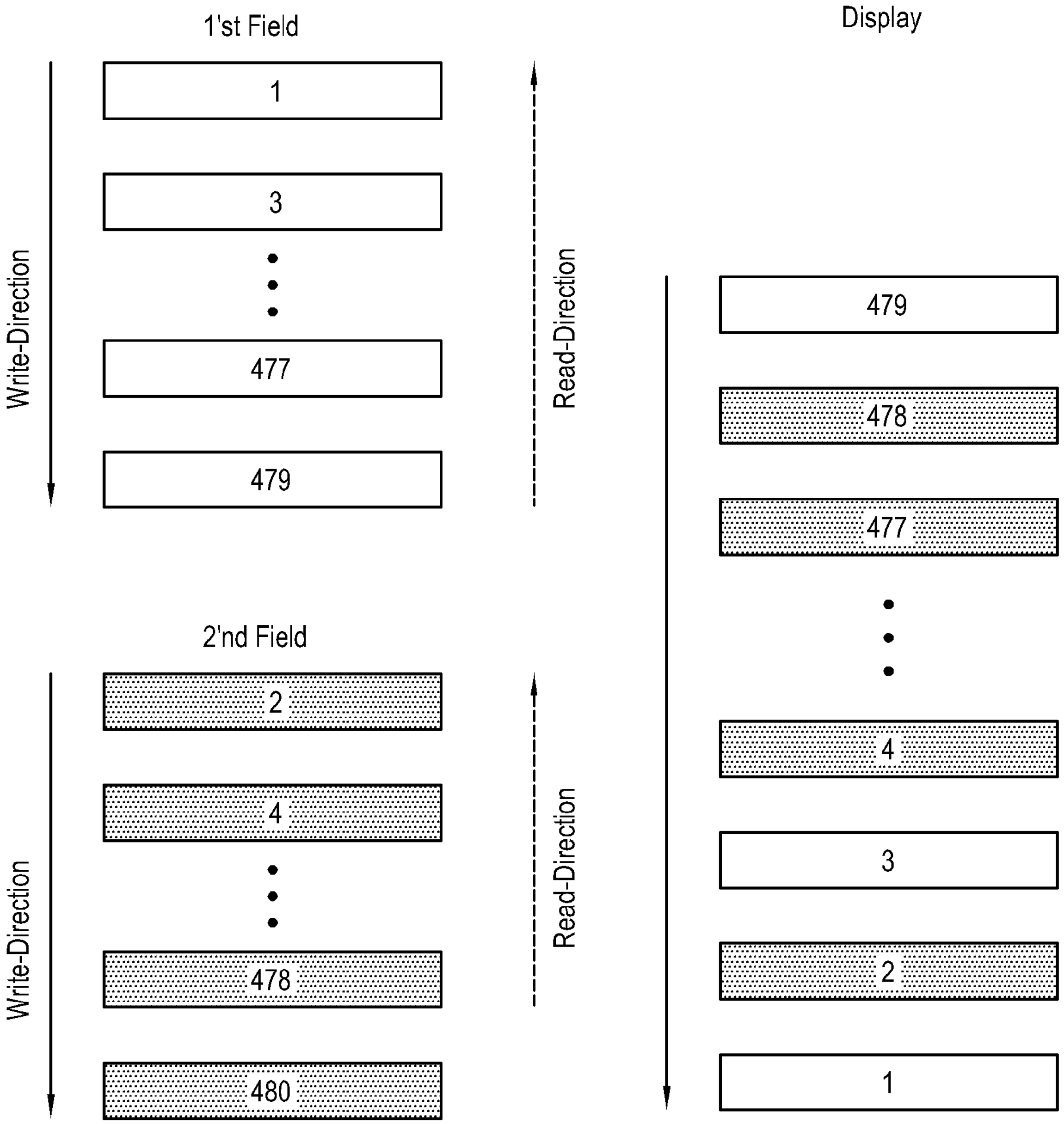
FIG. 7B illustrates a vertical flip image processed by an even/odd swap function according to the present invention.

FIG. 7B illustrates a vertical flip image processed by the even/odd swap function according to an exemplary embodiment of the present invention.

In the interlaced scanning mode, if lines stored in an odd-even order are inversely read, the lines are displayed in an even-odd order, thereby causing the field inversion. To prevent this field inversion, the even/odd swap function is performed. When the even/odd swap function is performed, the last line in the memory unit 120 is ignored and the next line is firstly processed. That is, as shown in FIG. 7B, the last even line, that is, the 480th line is ignored, and the last odd line, that is, the 479th line is firstly processed. Accordingly, the fields can be displayed in the odd-even order, thereby realizing a correct and definite image or video screen.

On the other hand, if an image frame inverted upside down when written in the memory unit 120, the even/odd swap function is performed as follows: The lines are written in the memory unit 120 in the order of the 480th, 479th, 478th, . . . and first lines. That is, the even 480th line is firstly written in the memory unit 120. Thus, the first even 480th line is ignored, i.e., skipped, and the next line, that is, the first odd 479th line is firstly processed, for display of an odd-even order.

Figure 8A:
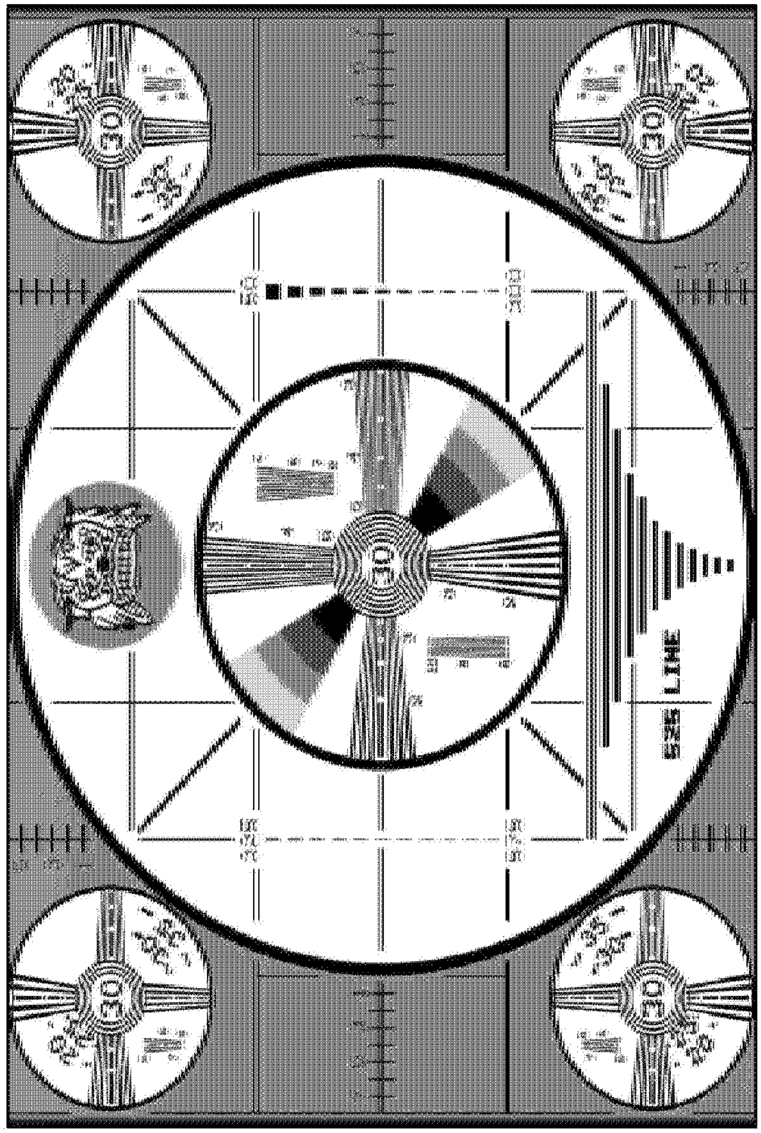
FIG. 8A illustrates an example of an image with field inversion being generated.
Figure 8B:
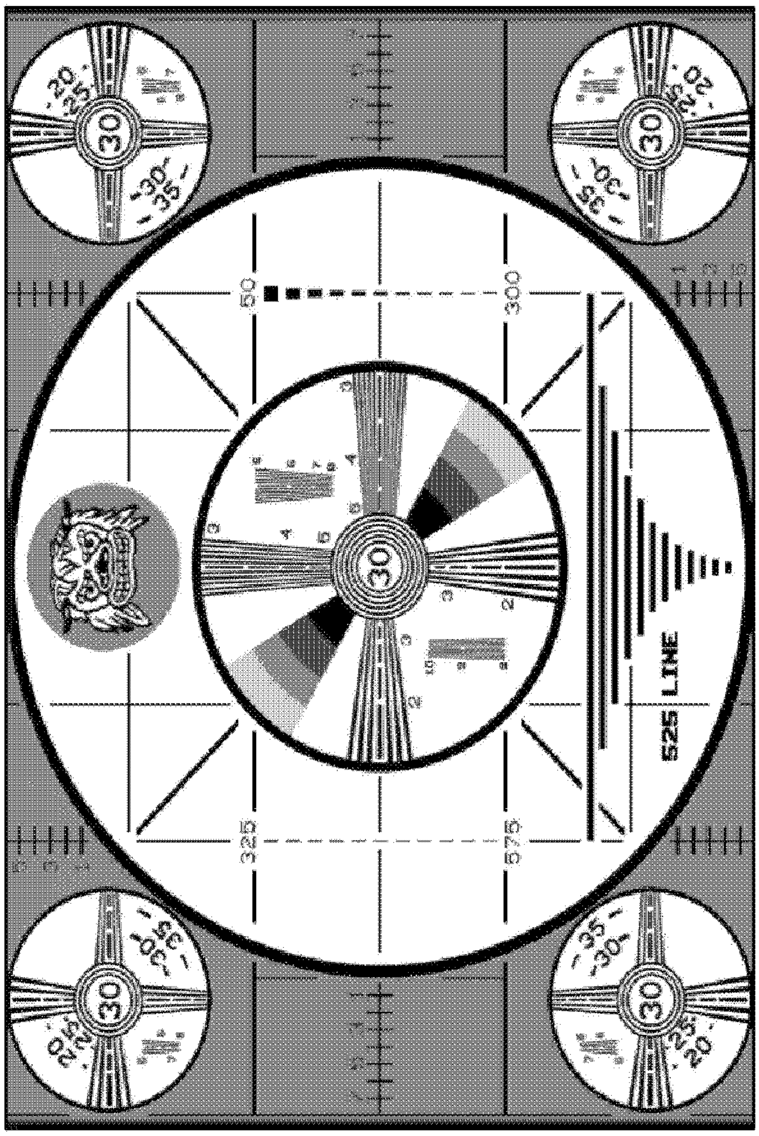
FIG. 8B illustrates an example of an image processed by an even/odd swap function according to the present invention.

FIG. 8A illustrates an example of an image in which field inversion occurs; and FIG. 8B illustrates an example of an image processed by the even/odd swap function according to the present invention.

If field inversion occurs, as shown in FIG. 8A, a coarse boundary line is generated in an image. The field inversion can disappear by the even/odd swap function. Referring to FIG. 8B, it can be seen that the coarseness of boundary lines are remarkably alleviated.

Figure 9:
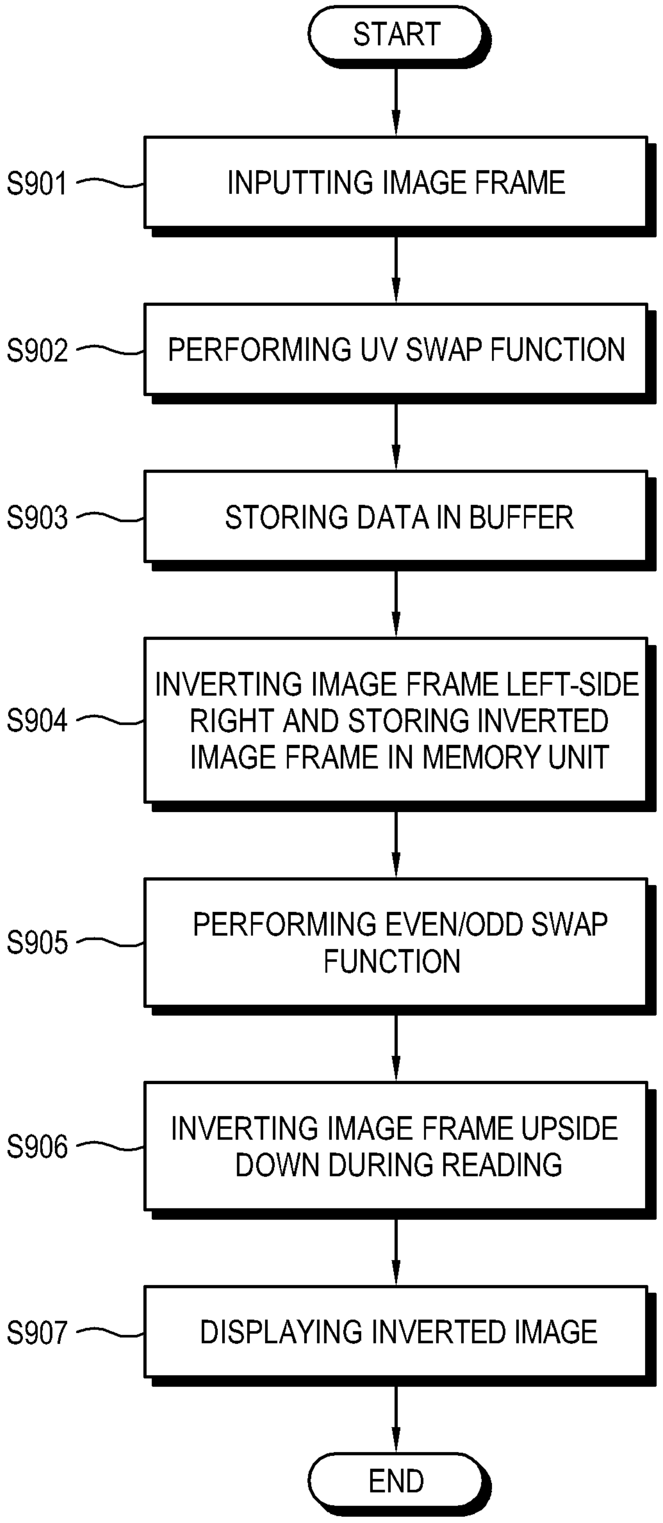
FIG. 9 is a flow diagram illustrating an video processing process according to an exemplary embodiment of the present invention.

FIG. 9 illustrates a video processing process according to an exemplary embodiment of the present invention. In this respect, it is assumed that an image frame is inverted left-side right when written in the memory unit 120 and inverted upside down when read from the memory unit 120, thereby realizing an image or video screen inverted left-side right and upside down.

Firstly, an image frame is inputted from the outside (S901).

Then, the video processing apparatus 100 performs the UV swap function for the image frame (S902). That is, when an RGB signal or a YUV signal is converted through inside processing, the U and V components in data units forming a pixel are inverted.

Then, the data units with the U and V components being inverted are stored in the buffer 110 (S903).

Then, the image frame is inverted left-side right and stored in the memory unit 120 (S904). Thus, a mirror image inverted left-side right is obtained.

Then, the video processing apparatus 100 performs the even/odd swap function (S905). As the even/odd swap function is performed, the last even line written in the memory unit 120 is ignored, and the next odd line is firstly processed. As described above, in the case of the progressive scanning mode, the even/odd swap function need not be performed.

However, in the case of televisions, since the interlaced scanning mode is generally employed, the even/odd swap function should be performed.

Then, the image frame is inverted upside down when read from the memory unit 120 (S906). Thus, a vertical flip image in which an image frame is inverted upside down is generated. Consequently, an image which is inverted left-side down and upside down is obtained.

Then, the inverted image is displayed (S907).

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus comprising:

a buffer which stores data of an image frame which comprises a plurality of lines inputted from an outside in line units;

a memory unit which randomly writes and reads the data of the image frame;

a video processing unit which processes and outputs the data of the image frame; and a central processing unit which inverts the data of the image frame in an upside down direction when writing the data of the image frame stored in the buffer, to the memory unit or reading the data of the image frame from the memory unit, wherein, if the central processing unit processes the data of the image frame inverted upside down during the writing, the central processing unit skips a first line of the data of the image frame inverted upside down stored in the memory unit and skips processing of the skipped first line, wherein, if the central processing unit inverts the data of the image frame in the upside down direction during the reading, the central processing unit skips a last line of the image frame stored in the memory unit and skips processing of the skipped last line, wherein the memory unit comprises a plurality of regions, and wherein the central processing unit writes the data of the image frame into one of the plurality of regions in a right side up direction and writes the data of the image frame into another of the plurality of regions in the inverted upside down direction which is opposite the right side up direction.

2. The apparatus according to claim 1, wherein the buffer is included in the central processing unit or the memory unit.

3. The apparatus according to claim 1, wherein the central processing unit inverts the data of the image frame in a left-side right direction when writing the data of the image frame stored in the buffer to the memory unit or when reading the data of the image frame from the memory unit.

4. The apparatus according to claim 2, wherein the central processing unit inverts the image frame in a left-side right direction when writing the data of the image frame stored in the buffer to the memory unit or when reading the data of the image frame from the memory unit.

5. The apparatus according to claim 1, wherein the central processing unit processes the data of the image frame written in the memory unit by interlaced scanning.

6. The apparatus according to claim 5, wherein if the central processing unit processes the data of the image frame inverted upside down during the writing, by the interlaced scanning, the central processing unit skips a first even line of the data of the image frame inverted upside down stored in the memory unit and first processes a first odd line of the data of the image frame inverted upside down stored in the memory unit.

7. The apparatus according to claim 5, wherein if the central processing unit inverts the data of the image frame in the upside down direction during the reading, by the interlaced scanning, the central processing unit skips a last even line of the image frame stored in the memory and first processes a last odd line of the data of the image frame stored in the memory.

8. The apparatus according to claim 3, wherein the central processing unit inverts in the left-side right direction the data of the image frame stored in the buffer in line units when writing the data of the image frame in the memory unit, and inverts in the upside down direction the data of the image frame written in the memory when reading the data of the image frame.

9. A video processing method in a video processing apparatus, comprising:

storing data of an image frame which comprises a plurality of lines inputted from an outside in line units;

inverting the data of the image frame in an upside down direction when writing the data of the image frame in a memory unit or when reading the data of the image frame from the memory unit; and outputting the read data of the image frame, wherein inverting the data when writing comprises, skipping a first line of the data of the image frame inverted upside down stored in the memory unit and skipping processing of the skipped first line, wherein inverting the data when reading comprises, skipping a last line of the image frame stored in the memory unit and skipping processing of the skipped last line, wherein the memory unit comprises a plurality of regions, and wherein the method further comprises:

writing the data of the image frame into one of the plurality of regions in a right side up direction and writing the data of the image frame into another of the plurality of regions in the inverted upside down direction which is opposite the right side up direction.

10. The method according to claim 9, wherein the data of the image frame written in the memory unit is processed by interlaced scanning.

11. The method according to claim 10, wherein a first even line of the image frame stored in the memory unit is skipped and a first odd line is first processed if data of the image frame inverted upside down is processed by the interlaced scanning.

12. The method according to claim 10, wherein a last even line of the image frame stored in the memory unit is skipped and a last odd line is processed if the image frame is inverted upside down during the reading.

13. A video processing method in a video processing apparatus, comprising:

storing image data in line units;

inverting the stored image data in one of a horizontal direction and vertical direction when writing the image data in a memory unit;

inverting the written image data in another of the horizontal direction and the vertical direction when reading the written image data from the memory unit; and outputting the read image data, wherein the inverting the image data when writing comprises skipping a first line of the image data inverted in one of the horizontal direction and the vertical direction and skipping processing of the skipped first line, wherein the inverting the written image data when reading comprises skipping a last line of the written image data inverted in the other of the horizontal direction and the vertical direction and skipping processing of the skipped last line, wherein the memory unit comprises a plurality of regions, and wherein the method further comprises:

writing the image data into one of the plurality of regions in a right side up direction and writing the image data into another of the plurality of regions in an inverted upside down direction which is opposite the right side up direction.

14. The apparatus according to claim 3, wherein, if the central processing unit inverts the data of the image frame in the left-side right direction during the writing or the reading, the central processing unit inverts a chrominance component U and a chrominance component V for forming a pixel and stores the inverted chrominance components U and V in the buffer.

15. The apparatus according to claim 4, wherein, if the central processing unit inverts the data of the image frame in the left-side right direction during the writing or the reading, the central processing unit inverts a chrominance component U and a chrominance component V for forming a pixel and stores the inverted chrominance components U and V in the buffer.

16. The method according to claim 9, further comprising inverting the data of the image frame in a left side right direction when writing the data of the image frame in a memory unit or reading the data of the image frame from the memory unit.

17. The apparatus according to claim 15, wherein inverting the data of the image frame in the left side right direction is performed when writing the data of the image frame in the memory unit, and inverting the data of the image frame in the upside down direction is performed when reading the data of the image frame from the memory unit.

* * * * *